(12) United States Patent
Tanomura et al.

(10) Patent No.: US 11,391,669 B2
(45) Date of Patent: Jul. 19, 2022

(54) GAS DETECTION SYSTEM

(71) Applicant: NEC CORPORATION, Tokyo (JP)

(72) Inventors: Masahiro Tanomura, Tokyo (JP); Chenhui Huang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 16/315,410

(22) PCT Filed: Jul. 5, 2017

(86) PCT No.: PCT/JP2017/024616
§ 371 (c)(1),
(2) Date: Jan. 4, 2019

(87) PCT Pub. No.: WO2018/008675
PCT Pub. Date: Jan. 11, 2018

(65) Prior Publication Data
US 2019/0234868 A1    Aug. 1, 2019

(30) Foreign Application Priority Data

Jul. 7, 2016  (JP) .............................. JP2016-134874

(51) Int. Cl.
*B64C 39/02* (2006.01)
*G01N 21/3504* (2014.01)
(Continued)

(52) U.S. Cl.
CPC ......... *G01N 21/3504* (2013.01); *B64C 13/20* (2013.01); *B64C 39/02* (2013.01);
(Continued)

(58) Field of Classification Search
CPC ........... G01N 21/3504; G01N 21/3151; G01N 2201/0214; G01N 2201/129; B64C 13/20;
(Continued)

(56) References Cited

U.S. PATENT DOCUMENTS 6,486,474 B1 * 11/2002 Owen ................. G01N 21/031
                                                       250/339.02
8,294,899 B2 * 10/2012 Wong ..................... G01S 17/95
                                                          356/437
(Continued)

FOREIGN PATENT DOCUMENTS

JP    2001-120151 A    5/2001
JP    2004-219379 A    8/2004
(Continued)

OTHER PUBLICATIONS

English Translation: Nakane, JP-2016050813 A, Apr. 2016, Japanese Patent Publication (Year: 2016).*
(Continued)

*Primary Examiner* — Nadeem Odeh
(74) *Attorney, Agent, or Firm* — Sughrue Mion, PLLC

(57) ABSTRACT

A gas detect ion system includes: a sending aerial vehicle in which a light-emitting unit is installed; a small unmanned aerial vehicle including a receiving aerial vehicle in which a light-receiving unit is installed; a gas computing and displaying unit that computes and displays gas information; and a photographing-route computing unit that computes a photographing route for the small unmanned aerial vehicle. The receiving aerial vehicle receives light from the light-emitting unit of the sending aerial vehicle by using the light-receiving unit thereof and sends the result as gas data to the gas computing and displaying unit. The gas computing and displaying unit computes the gas information from the gas data. The photographing-route computing unit computes the photographing route from the position of the small unmanned aerial vehicle and the amount of energy remaining in the small unmanned aerial vehicle.

20 Claims, 10 Drawing Sheets

(51) Int. Cl.
    *B64C 13/20*     (2006.01)
    *B64D 27/24*     (2006.01)
    *B64D 47/06*     (2006.01)
    *B64D 47/08*     (2006.01)
    *G01N 21/31*     (2006.01)
    *G05D 1/10*     (2006.01)

(52) U.S. Cl.
    CPC ............ *B64C 39/024* (2013.01); *B64D 27/24* (2013.01); *B64D 47/06* (2013.01); *B64D 47/08* (2013.01); *G01N 21/3151* (2013.01); *G05D 1/104* (2013.01); *B64C 2201/127* (2013.01); *G01N 2201/0214* (2013.01); *G01N 2201/129* (2013.01)

(58) Field of Classification Search
    CPC . B64C 39/02; B64C 39/024; B64C 2201/127; B64C 2201/12; B64D 27/24; B64D 47/06; B64D 47/08; G05D 1/104; G05D 1/0005
See application file for complete search history.

(56) References Cited

U.S. PATENT DOCUMENTS

| | | | |
|---|---|---|---|
| 10,065,739 B2* | 9/2018 | Duesterhoft | B64D 1/16 |
| 2005/0197749 A1 | 9/2005 | Nichols et al. | |
| 2006/0092423 A1* | 5/2006 | Servaites | G01N 33/225 |
| | | | 356/437 |
| 2006/0268947 A1* | 11/2006 | Kalayeh | G01N 21/39 |
| | | | 372/20 |
| 2009/0222207 A1* | 9/2009 | Bernhardt | G01S 17/89 |
| | | | 702/2 |
| 2014/0204382 A1* | 7/2014 | Christensen | G01N 21/031 |
| | | | 356/402 |
| 2016/0009390 A1 | 1/2016 | Kugelmass | |
| 2016/0196751 A1 | 7/2016 | Jarrell | |
| 2016/0214715 A1* | 7/2016 | Meffert | B64C 39/024 |
| 2016/0232794 A1* | 8/2016 | Hafeez | G08G 5/0043 |
| 2017/0322383 A1* | 11/2017 | Bingham | G02B 6/4298 |
| 2018/0222581 A1* | 8/2018 | Nagasawa | B64C 39/02 |

FOREIGN PATENT DOCUMENTS

| | | | | |
|---|---|---|---|---|
| JP | 2005-127873 | A | | 5/2005 |
| JP | 2006-082774 | A | | 3/2006 |
| JP | 2007-526175 | A | | 9/2007 |
| JP | 2008-116263 | A | | 5/2008 |
| JP | 2010-210273 | A | | 9/2010 |
| JP | 2011-133165 | A | | 7/2011 |
| JP | 2016-050813 | A | | 4/2016 |
| JP | 2016050813 | A | * | 4/2016 |
| JP | 2017-110984 | A | | 6/2017 |

OTHER PUBLICATIONS

International Search Report for PCT/JP2017/024616 dated Sep. 26, 2017 (PCT/ISA/210).
Written Opinion of the International Searching Authority dated Sep. 26, 2017 (PCT/ISA/237).
Japanese Office Action for JP Application No. 2018-526413 dated Jun. 15, 2021 with English Translation.

* cited by examiner

WHEN ENERGY REMAINING AMOUNT OF
EACH VEHICLE IS NOT CONSIDERED

WHEN ENERGY REMAINING AMOUNT OF
EACH VEHICLE IS CONSIDERED

GAS DETECTION SYSTEM

CROSS REFERENCE TO RELATED APPLICATIONS

This application is a National Stage of International Application No. PCT/JP2017/024616 filed Jul. 5, 2017, claiming priority based on Japanese Patent Application No. 2016-134874, filed Jul. 7, 2016, the disclosure of which is incorporated herein in its entirety by reference.

TECHNICAL FIELD

The present invention relates to a gas detection system, and particularly relates to a gas detection system utilizing a plurality of aerial vehicles.

BACKGROUND ART

In recent years, due to greenhouse gas reduction and an increase in threat of terrorism, an expectation has been rising for detection or discrimination of a gaseous body other than flame, such as carbon dioxide or nerve gas, remotely from a space targeted for detection. Hereinafter, detection or discrimination of a gaseous body remotely from a space targeted for detection is referred to as "remote gas detection".

In order to perform this remote gas detection, a method (passive type) of receiving radiant infrared light from gas, or a method (active type) of receiving reflected infrared light or transmitted infrared light of infrared light applied to gas, is used. Most of the gases targeted for detection have emissivity or transmittance inherent in the respective gas on an infrared band. By measuring the emissivity or transmittance, remote gas detection becomes possible. For example, in the remote gas detection, there is methane detection using a near-infrared band, greenhouse gas detection using a mid-wavelength infrared band of 2 to 4 µm, high-temperature gas detection using a band of 8 to 13 µm, and the like. Compared to the passive type, the active type uses a light source such as a laser, and therefore enables low-temperature or low-concentration gas detection, but on the other hand, leads to high power consumption.

As a means of performing the remote gas detection at low cost and safely, using a small unmanned aerial vehicle such as a drone is conceivable. Patent Literature 1 (PTL1) relates to a gas measurement device using an aerial vehicle, and suggests that light emitted by a first aerial vehicle is reflected by a reflector of a second aerial vehicle, and then received by the first aerial vehicle, and thereby, gas concentration in a region between the first aerial vehicle and the second aerial vehicle is measured. In PTL1, gas concentration measurement data are transmitted to a ground controller from an aerial vehicle, and a distribution of gas concentration is able to be freely measured in a desired region.

CITATION LIST

Patent Literature

[PTL1] Japanese Laid-Open Patent Application No. 2016-50813
[PTL2] Japanese Laid-Open Patent Application No. 2006-82774
[PTL3] Japanese Laid-Open Patent Application No. 2010-210273
[PTL4] Japanese Laid-Open Patent Application No. 2008-116263
[PTL5] Japanese Laid-Open Patent Application No. 2004-219379
[PTL6] Japanese Laid-Open Patent Application No. 2005-127873

SUMMARY OF INVENTION

Technical Problem

However, the above-described gas measurement device using the aerial vehicle in PTL1 has the following problem to be solved.

It is generally difficult to install a high-capacity battery in a drone. Thus, attempting to expand a search range in order to detect a three-dimensional structure needs battery exchange several times, and there is therefore a problem that the time required for gas detection becomes considerably long.

Furthermore, in a gas detection system of the background art, when a detector is installed on a drone, and there is power-consuming computation processing such as spectral dispersion processing, battery exchange is also needed several times. Thus, there is a problem that time required for gas detection becomes considerably long.

An unmanned aerial vehicle normally receives an instruction by wireless communication from a ground controller, and flies in air in accordance with the instruction. When the unmanned aerial vehicle becomes unable to appropriately receive an instruction from the ground controller due to deterioration in a communication environment or the like, there is concern that flying of the unmanned aerial vehicle becomes uncontrollable, and the unmanned aerial vehicle collides with ground, an obstacle or the like, and is broken or crashed due to impact of the collision.

Patent Literature 2 (PTL2) relates to a control method for an unmanned aerial vehicle, and suggests that, when a problem such as deterioration of a communication environment occurs in an unmanned aerial vehicle, the unmanned aerial vehicle is automatically returned by autonomous control of the unmanned aerial vehicle. The unmanned aerial vehicle in PTL2 photographs a house, a building, or the like from air with a camera, and detects concentration of poisonous gas or the like by an observation sensor. Then, when a problem such as deterioration of a communication environment occurs in the unmanned aerial vehicle, the unmanned aerial vehicle is automatically returned by autonomous control of the unmanned aerial vehicle.

PTL2 relates to autonomous control of a single unmanned aerial vehicle, and this cannot be applied as it is to a gas measurement device using a plurality of aerial vehicles as suggested by PTL1. When it is assumed that an autonomous control function suggested by PTL2 is provided in both the first aerial vehicle and the second aerial vehicle in PTL1, the aerial vehicles return by autonomous control each time a problem such as deterioration of a communication environment occurs in either one of the aerial vehicles. Thus, even though breakage of an aerial vehicle can be prevented against occurrence of a problem such as deterioration of a communication environment, gas measurement is interrupted every time by returned aerial vehicle. Therefore, a problem that time required for gas detection becomes long is not solved.

Furthermore, it has been difficult for the background art to detect a gas having absorption on a band outside of a wavelength band called an atmospheric window (hereinafter, out of band). A reason for this is that, out of band, a background spectrum greatly changes depending on an atmospheric state. Particularly, a band of 5 to 8 µm is an absorption band of water, and is therefore greatly affected by not only a rainy environment but also humidity.

Patent Literature 3 (PTL3) relates to gas concentration measurement adopting an open path system, and suggests that, by emanating infrared light to outside of a measurement device and observing infrared light reflected by a reflecting mirror, gas concentration on a path of the infrared light is measured.

Patent Literature 4 (PTL4) relates to a gas concentration monitoring system which monitors gas concentration of an abnormal gas in atmosphere, in a wide outdoor gas abnormality monitoring zone such as a facility having a possibility of generating gas and a periphery thereof. PTL4 suggests that a position of leakage gas is specified by disposing a fixed station for laser light reception at a suitable place on a peripheral edge of a gas abnormality monitoring zone, and using a mobile station for laser light reception moving in the gas abnormality monitoring zone.

Patent Literature 5 (PTL5) relates to a gas concentration monitoring system which monitors gas leaking from an underground disposal target region for greenhouse gas. PTL5 suggests that a large number of posts are erected in such a way as to surround a retention target region for underground disposal, a light source unit or a light receiving unit is attached to an upper part of each post, and gas concentration is thereby calculated, based on data acquired from laser light.

Patent Literature 6 (PTL6) relates to a navigation device which is applied to a movable body such as an electric bicycle, and thus guides a user. PTL6 suggests that a plurality of routes to a destination are retrieved, a degree of change in height is determined for each route, and a route suited to a battery is selected from the plurality of routes.

An object of the present invention is to provide a gas detection system and a gas detection method utilizing a plurality of aerial vehicles, which enable detection precisely and in a short time.

Solution to Problem

To achieve the above-mentioned object, a gas detection system according to a present invention, includes: a small unmanned aerial vehicle including a transmitting aerial vehicle in which a light-emitting unit is installed, and a receiving aerial vehicle in which a light-receiving unit is installed; a gas computing and displaying unit which computes and displays gas information; and a photographing-route computing unit which computes a photographing route by the small unmanned aerial vehicle, wherein the receiving aerial vehicle receives light from the light-emitting unit of the transmitting aerial vehicle by the light-receiving unit and transmits the light, as gas data, to the gas computing and displaying unit, the gas computing and displaying unit computes the gas information from the gas data, and the photographing-route computing unit computes the photographing route from a position of the small unmanned aerial vehicle and an energy remaining amount of the small unmanned aerial vehicle.

A gas detection method according to a present invention, for a gas detection system includes: a small unmanned aerial vehicle including a transmitting aerial vehicle in which a light-emitting unit is installed, and a receiving aerial vehicle in which light-receiving unit is installed; a gas computing and displaying unit which computes and displays gas information; and a photographing-route computing unit which computes a photographing route by the small unmanned aerial vehicle, the gas detection method comprises:

receiving light from the light-emitting unit of the transmitting aerial vehicle by the light-receiving unit and transmitting the light, as gas data, to the gas computing and displaying unit by the receiving aerial vehicle;

computing the gas information from the gas data by the gas computing and displaying unit; and computing the photographing route from a position of the small unmanned aerial vehicle and an energy remaining amount of the small unmanned aerial vehicle by the photographing-route computing unit.

Advantageous Effect of Invention

The present invention is able to provide a gas detection system and a gas detection method utilizing a plurality of aerial vehicles, which enable gas detection precisely and in a short time.

EXAMPLE EMBODIMENT

Preferred example embodiments of the present invention will be described in detail with reference to the drawings.

First Example Embodiment

Figure 1:
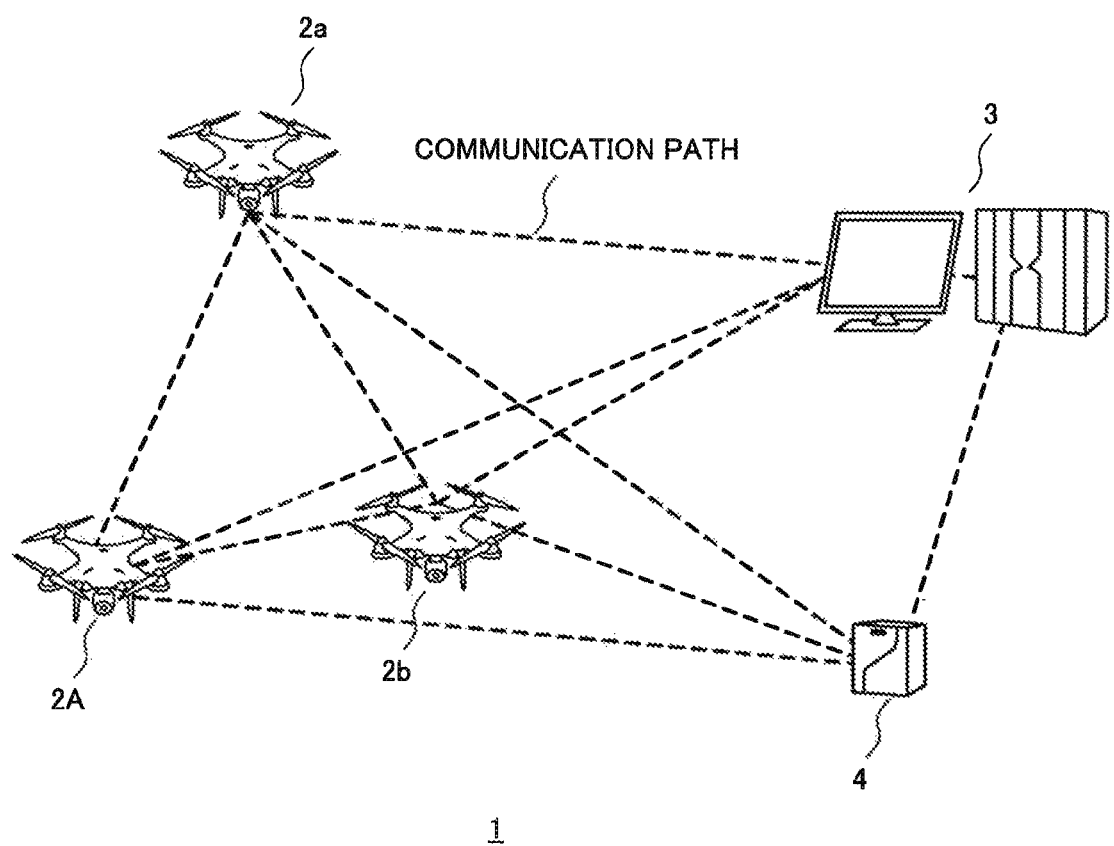
FIG. 1 is a conceptual diagram for illustrating a configuration of a gas detection system according to a first example embodiment.
Figure 3:
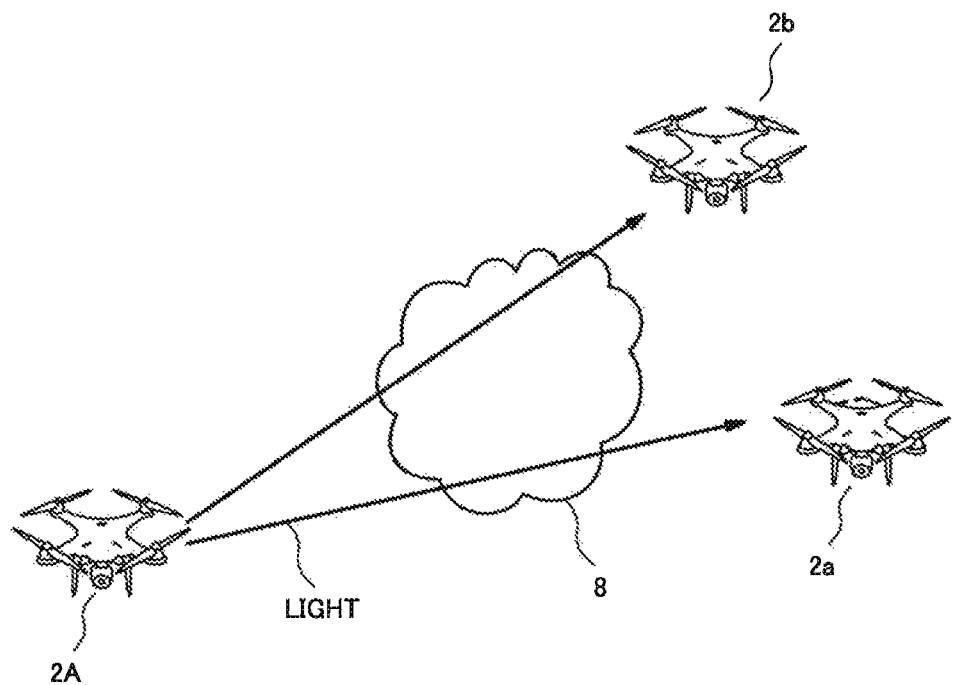
FIG. 3 is a conceptual diagram for illustrating a gas detection operation according to the first example embodiment.

First, a gas detection system according to a first example embodiment is described with reference to the drawings. FIG. 1 is a conceptual diagram for illustrating a configuration of the gas detection system according to the first example embodiment. FIG. 3 is a conceptual diagram for illustrating a gas detection operation according to the first example embodiment.

A gas detection system 1 according to the present example embodiment is configured by including a small unmanned aerial vehicle, a gas computing and displaying unit 3, and a photographing-route computing unit 4. The small unmanned aerial vehicle includes at least one or more aerial vehicles installed with a light-emitting unit which emits infrared light, and at least two or more aerial vehicles installed with light-receiving units which receive infrared light. Hereinafter, an aerial vehicle installed with a light-emitting unit which emits infrared light is referred to as a transmitting aerial vehicle, and an aerial vehicle installed with a light-receiving unit which receives infrared light is referred to as a receiving aerial vehicle.

The photographing-route computing unit 4 computes a photographing route by the small unmanned aerial vehicle. An idea of computation of a photographing route will be described later. The gas computing and displaying unit 3 computes and displays gas information (a kind, concentration, and a distribution shape). The gas computing and displaying unit 3 has a function of processing a dispersed spectrum into an image.

Figure 2A:
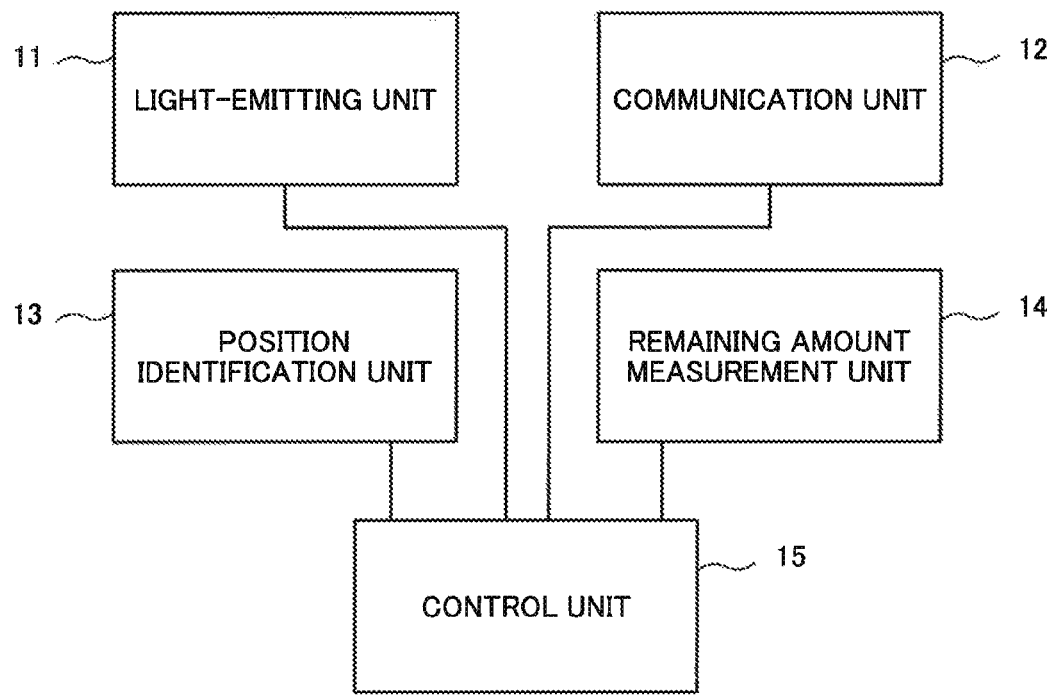
FIG. 2A is a block diagram of a transmitting aerial vehicle.
Figure 2B:
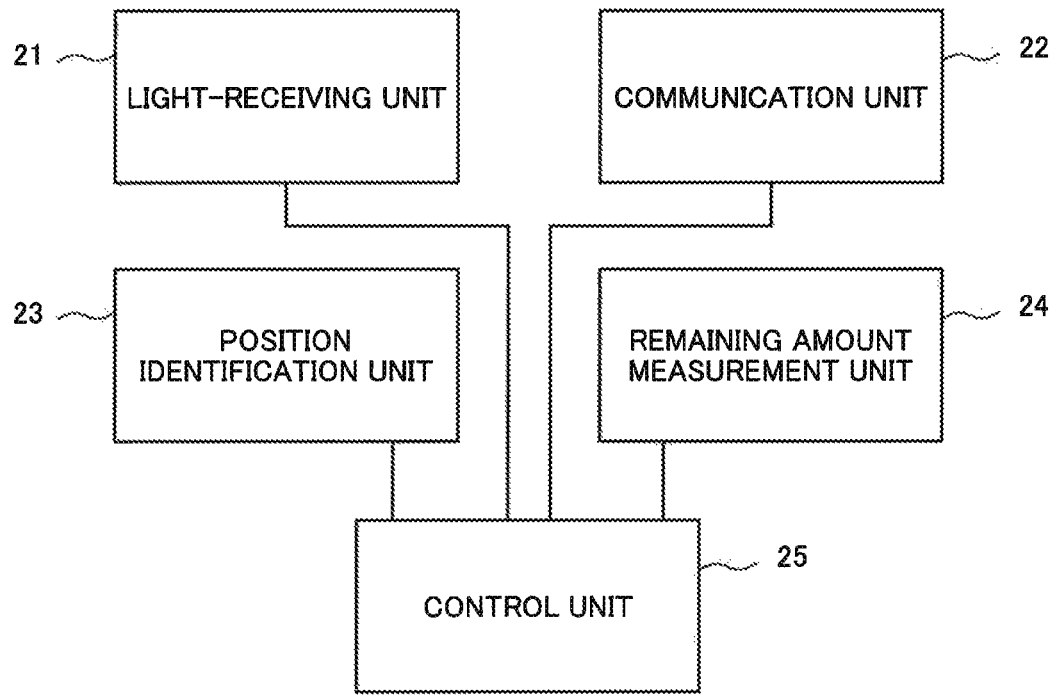
FIG. 2B is a block diagram of a receiving aerial vehicle.

In the present example embodiment, a case of three small unmanned aerial vehicles is described. Although the number of small unmanned aerial vehicles is three in the present example embodiment, it may be equal to or more than three. FIG. 2A is a block diagram of a transmitting aerial vehicle, and FIG. 2B is a block diagram of a receiving aerial vehicle.

As in FIG. 2A, a small unmanned aerial vehicle 2A as one example of a transmitting aerial vehicle among three small unmanned aerial vehicles includes a light-emitting unit 11, a communication unit 12, a position identification unit 13, a remaining amount measurement unit 14, and a control unit 15.

The light-emitting unit 11 emits infrared light. Note that a light source of the light-emitting unit 11 is not limited to an infrared light source. A light source of the light-emitting unit 11 may be a white light source, or a light source which emits light having a particular wavelength. In addition, the light-emitting wavelength may be variable. Alternatively, the light-emitting unit 11 may have a function of emitting infrared light having a narrow wavelength band.

The communication unit 12 performs a communication with other small unmanned aerial vehicles 2a and 2b, a communication with the gas computing and displaying unit 3, and a communication with the photographing-route computing unit 4. The position identification unit 13 identifies a position of a small unmanned aerial vehicle. The remaining amount measurement unit 14 measures an energy remaining amount of a small unmanned aerial vehicle. The control unit 15 controls the whole small unmanned aerial vehicle.

As illustrated in FIG. 2B, the small unmanned aerial vehicles 2a and 2b as examples of receiving aerial vehicles among three small unmanned aerial vehicles each include a light-receiving unit 21, a communication unit 22, a position identification unit 23, a remaining amount measurement unit 24, and a control unit 25.

The light-receiving unit 21 may be a light-receiving unit for a wide wavelength band, or a light-receiving unit which receives light having a particular wavelength. In other words, the light-receiving unit 21 may have a function of dispersing infrared light into a spectrum, and receiving the dispersed spectrum. Alternatively, the light-receiving unit 21 may be a light-receiving unit which changes a light-receiving wavelength thereof and then selectively receives light. In this case, a detection wavelength of the light-receiving unit of the small unmanned aerial vehicle 2a and a detection wavelength of the light-receiving unit of the small unmanned aerial vehicle 2b may be different wavelengths.

The communication unit 22 performs a communication with another small unmanned aerial vehicle such as the small unmanned aerial vehicle 2A, a communication with the gas computing and displaying unit 3, and a communication with the photographing-route computing unit 4. The position identification unit 23 identifies a position of a small unmanned aerial vehicle. The remaining amount measurement unit 24 measures an energy remaining amount of a small unmanned aerial vehicle. The control unit 25 controls the whole small unmanned aerial vehicle.

Operation of First Example Embodiment

Figure 4:
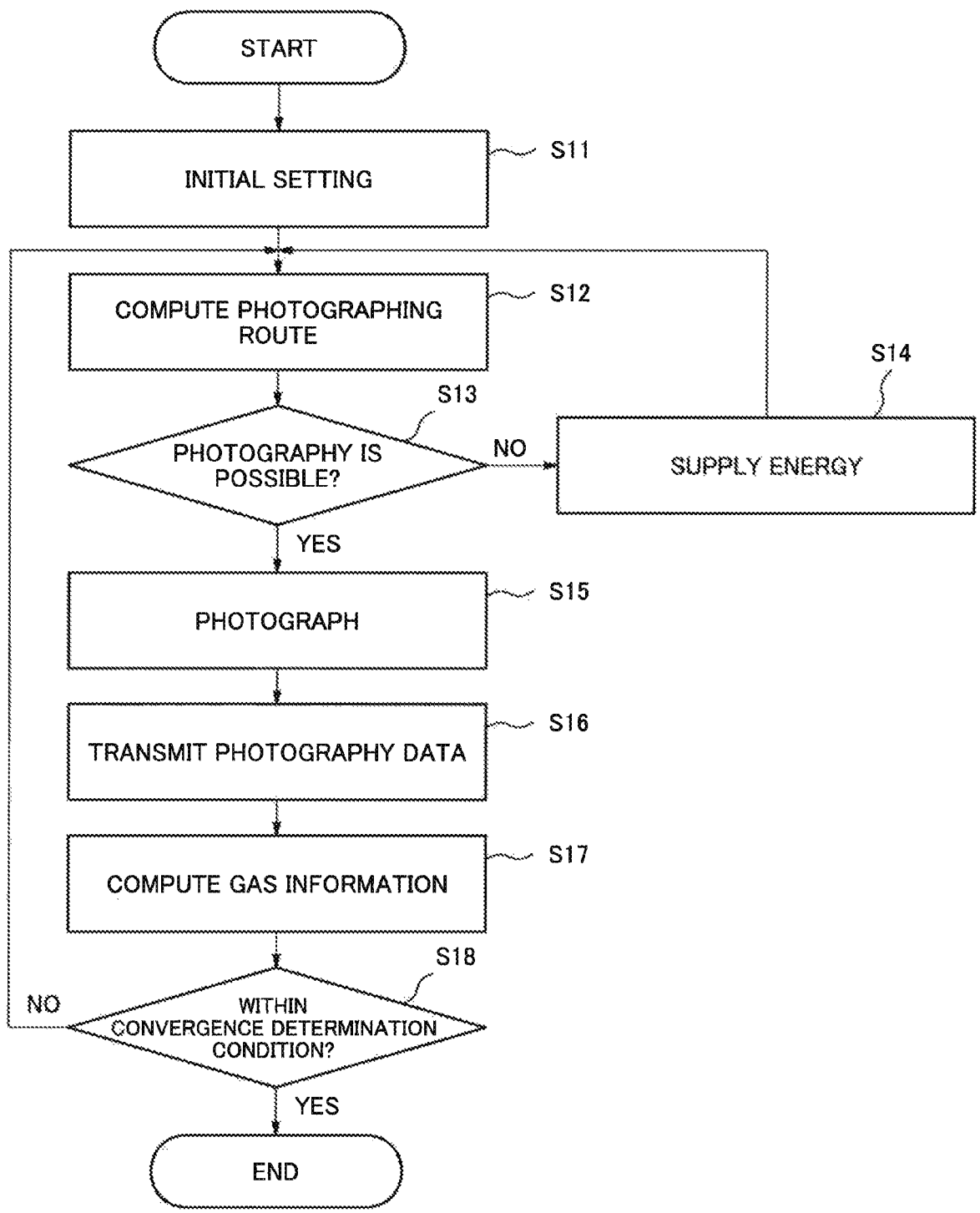
FIG. 4 is a flowchart for illustrating an operation of a gas detection system according to the first example embodiment.

Next, an operation of the gas detection system by the present example embodiment is described with reference to a flowchart of FIG. 4.

First, initial setting of the whole system is performed (step S11). Specifically, three-dimensional gas information 8, a convergence determination condition of gas information, and current positions and energy remaining amounts of the small unmanned aerial vehicles 2A, 2a, and 2b are initially set. Next, based on the above-described three-dimensional gas information, and the current position information and energy remaining amounts of the small unmanned aerial vehicles 2A, 2a, and 2b, the photographing-route computing unit 4 computes a photographing route of each small unmanned aerial vehicle in such a way that energy remaining amounts after an end of photography become equal to each other (step S12). Note that, in this computation of a photographing route, it is conceivable that a photographing route is computed from a position where data in the gas computing and displaying unit 3 is lacking gas information, a position of each small unmanned aerial vehicle, and an energy remaining amount of each small unmanned aerial vehicle. Thus, it becomes possible to reduce frequency of battery exchange in a small unmanned aerial vehicle, and detect gas information precisely and in a short time. For example, generally, power consumption of a light-emitting unit is approximately 10 times different from power consumption of a light-receiving unit. Thus, wasteful battery exchange is not needed any more when energy run-out timings of a transmitting aerial vehicle and a receiving aerial vehicle are equalized to each other by decreasing a movement amount of the transmitting aerial vehicle and increasing a movement amount of the receiving aerial vehicle.

Next, it is determined whether or not photography by a small unmanned aerial vehicle is possible with a current energy remaining amount (step S13). When photography is not possible, energy is supplied to the small unmanned aerial vehicle (step S14). When photography is possible, the small unmanned aerial vehicles 2A, 2a, and 2b photograph the target three-dimensional gas information 8, based on the above-described photographing route (step S15). At a time of photography, light is applied to the small unmanned aerial vehicle 2a or the small unmanned aerial vehicle 2b from the small unmanned aerial vehicle 2A, based on information in the position identification unit installed in each small unmanned aerial vehicle. Next, the small unmanned aerial vehicle 2a and/or the small unmanned aerial vehicle 2b each transmit received data to the gas computing and displaying unit 3 (step S16). Then, new three-dimensional gas information is computed, based on the data received in the gas computing and displaying unit 3 (step S17). Then, it is determined whether or not the new gas information and the initially set gas information are within the convergence determination condition (step S18). When the new gas information and the initially set gas information are within the convergence determination condition, the operation is ended.

Note that, in the photography of the target three-dimensional gas information 8 (step S15), the light-emitting unit 11 and the light-receiving unit 21 may be provided with wavelength selectivity, and spectral dispersion may be performed accordingly. By performing spectral dispersion, it becomes possible to specifically discriminate a kind of gas.

Advantageous Effect in First Example Embodiment

According to the gas detection system in the present example embodiment, the photographing-route computing unit 4 computes an optimum photographing route from a position of each small unmanned aerial vehicle, and an energy remaining amount of each small unmanned aerial vehicle. This enables battery exchange timing of each vehicle to be the same. As a result, waste of battery exchange is eliminated, and it becomes possible to detect gas information precisely and in a short time.

Figure 5A:
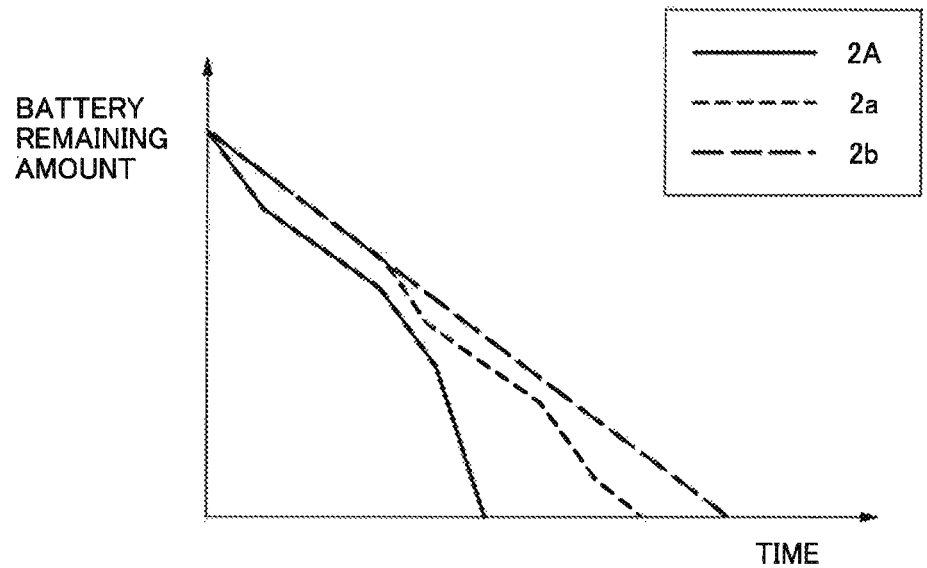
FIGS. 5A and 5B are graphs for illustrating an effect of an example embodiment.
Figure 5B:
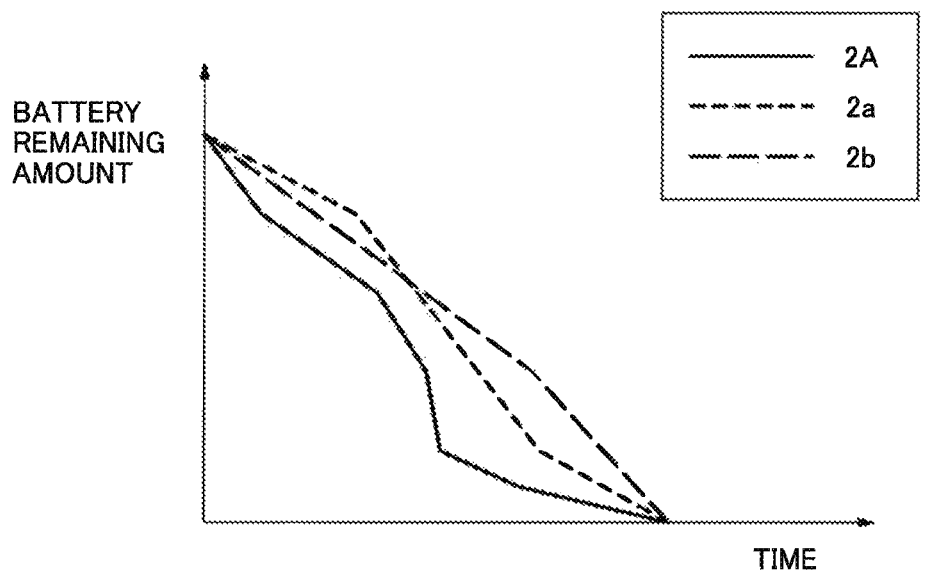

FIGS. 5A and 5B are graphs for illustrating an effect of the present example embodiment. FIG. 5A illustrates a battery remaining amount versus time for small unmanned aerial vehicles of a background art, and FIG. 5A illustrates a battery remaining amount versus time for each of the small unmanned aerial vehicles 2A, 2a, and 2b in the present example embodiment. The small unmanned aerial vehicles of the background art vary in time at which a battery remaining amount becomes zero. Thus, with the small unmanned aerial vehicle of the background art, it is necessary to interrupt gas detection and exchange a battery each time a battery remaining amount comes close to zero. Therefore, with the background art, time required for gas detection becomes considerably long. In contrast, in the present example embodiment, photographing routes by the small unmanned aerial vehicles 2A, 2a, and 2b are computed in consideration of energy remaining amounts or the like of the small unmanned aerial vehicles 2A, 2a, and 2b, and therefore, time at which a battery remaining amount becomes zero can be substantially the same in the small unmanned aerial vehicles as in FIG. 5B. Thus, timing of battery exchange in each vehicle can be substantially the same. As a result, waste of battery exchange is eliminated, and it becomes possible to detect gas information precisely and in a short time.

Particularly, a photographing route is computed from a position where data in the gas computing and displaying unit 3 are lacking gas information, a position of a small unmanned aerial vehicle, and an energy remaining amount of a small unmanned aerial vehicle. Thereby, it is possible to more efficiently detect gas information.

Furthermore, in the present example embodiment, two small unmanned aerial vehicles are installed with light-receiving units, and one small unmanned aerial vehicle is installed with a light-emitting unit. Since a number of small unmanned aerial vehicles installed with light-emitting units is smaller than a number of small unmanned aerial vehicles installed with light-receiving units, a number of costly light-emitting units is reduced, and therefore, cost also becomes lower.

When light having a narrow wavelength band is emitted by a light-emitting unit, spectral dispersion is able to be performed by receiving the infrared light in a light-receiving unit. By performing spectral dispersion, it becomes possible to specifically discriminate a kind of gas.

Second Example Embodiment

Next, a gas detection system according to a second example embodiment is described with reference to the drawings. A configuration of the gas detection system by the present example embodiment is the same as that in the first example embodiment. Therefore, a description of the configuration of the gas detection system in the present example embodiment is omitted. Although a number of small unmanned aerial vehicles is three in the present example embodiment, it may be equal to or more than three.

Operation of Second Example Embodiment

Figure 6:
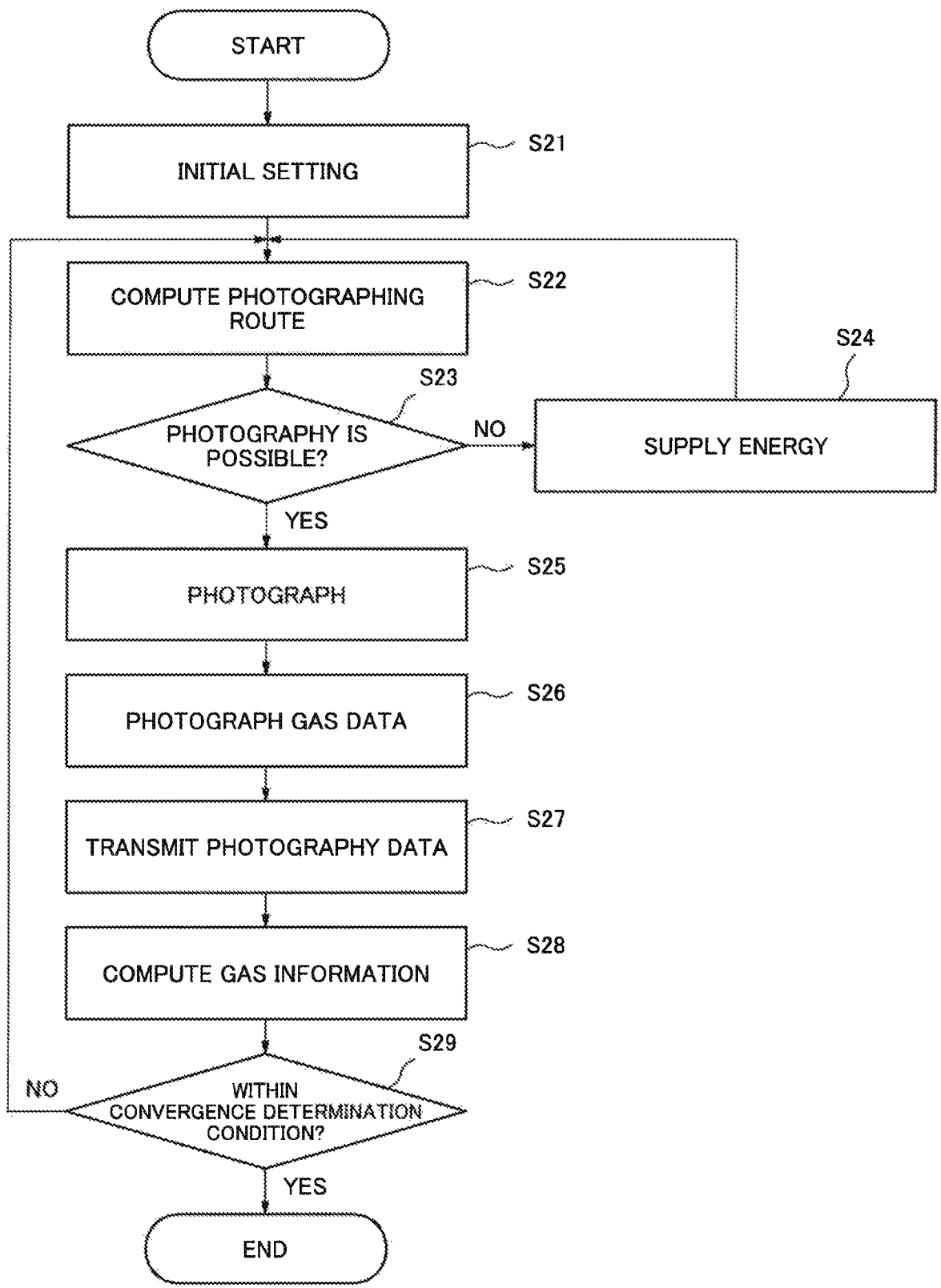
FIG. 6 is a flowchart for illustrating an operation of a gas detection system according to a second example embodiment.

An operation of the gas detection system by the present example embodiment is described with reference to a flowchart of FIG. 6.

As in the first example embodiment, initial setting of the system is first performed (step S21). Specifically, three-dimensional gas information 8, a convergence determination condition of gas information, and current positions and energy remaining amounts of small unmanned aerial vehicles 2A, 2a, and 2b are initially set. Next, based on the above-described three-dimensional gas information, and the current position information and energy remaining amounts of the small unmanned aerial vehicles 2A, 2a, and 2b, a photographing-route computing unit 4 computes a photographing route of each aerial vehicle in such a way that energy remaining amounts after an end of photography become equal to each other (step S22). Next, it is determined whether or not photography by a small unmanned aerial vehicle is possible with a current energy remaining amount (step S23). When photography is not possible, energy is supplied to the small unmanned aerial vehicle (step S24).

Next, based on the photographing route, the small unmanned aerial vehicles 2A, 2a, and 2b photograph data in a place where no gas is estimated to be present, in order to acquire correction data (step S25). When data on a place where no gas is estimated to be present is photographed, light is applied to the small unmanned aerial vehicle 2a and/or the small unmanned aerial vehicle 2b from the small unmanned aerial vehicle 2A, based on information in a position identification unit installed in each small unmanned aerial vehicle. Next, based on the photographing route, the small unmanned aerial vehicles 2A, 2a, and 2b photograph gas data in a place where gas is present (step S26). Then, the correct ion data and the gas data are transmitted to a gas computing and displaying unit 3 (step S27). Then, in the gas computing and displaying unit 3, new three-dimensional gas information is computed, 5 based on data corrected by use of the correction data (step S28). Then, it is determined whether or not the new gas information and the initially set gas information are within a convergence determination condition (step S29). When the new gas information and the initially set gas information are within the convergence determination condition, the operation is ended.

Alternatively, a band (2.8 to 3.5 μm band, 5 to 8 μm band, or 9.8 to 10.5 μm band) outside of an atmospheric window may be used as a wavelength band to be measured. In other words, a wavelength band of a light-emitting unit 11 of the small unmanned aerial vehicle 2A is a band (2.8 to 3.5 μm band, 5 to 8 μm band, or 9.8 to 10.5 μm band) outside of an atmospheric window. Moreover, a wavelength band of a light-receiving unit 21 of each of the small unmanned aerial vehicles 2a and 2b is a band (2.8 to 3.5 μm band, 5 to 8 μm band, or 9.8 to 10.5 μm band) outside of an atmospheric window.

Furthermore, gas to be detected is preferably gas having absorption on a wavelength band outside of an atmospheric window, such as acetone, benzoic acid, benzaldehyde, methyl benzoate, methane, chlorine gas, bromine gas, laughter gas, or carbon monoxide.

Advantageous Effect in Second Example Embodiment

According to the gas detection system in the present example embodiment, the photographing-route computing unit 4 computes an optimum photographing route from a position of each small unmanned aerial vehicle, and an energy remaining amount of each small unmanned aerial vehicle, as in the first example embodiment. This enables battery exchange timing of each vehicle to be the same. As a result, waste of battery exchange is eliminated, and it becomes possible to detect gas information precisely and in a short time.

Furthermore, in the present example embodiment, two small unmanned aerial vehicles are installed with light-receiving units, and one small unmanned aerial vehicle is installed with a light-emitting unit, as in the first example embodiment. Since a number of small unmanned aerial vehicles installed with light-emitting units is smaller than a number of small unmanned aerial vehicles installed with light-receiving units, a number of costly light-emitting units is reduced, and therefore, cost also becomes lower.

Still further, according to the present example embodiment, measurement data between a light-emitting unit and a light-receiving unit in which gas is estimated to be present is corrected by use of measurement data between a light-emitting unit and a light-receiving unit in which no gas is estimated to be present. This correct ion enables precise gas detect ion.

Particularly, in a band on which a wavelength band to be measured is outside of an atmospheric window, absorption by water content or the like is great (e.g., 90%). Thus, the value can be correctly projected by using correction data, and precise data can be acquired.

Third Example Embodiment

Next, a gas detection system according to a third example embodiment is described with reference to the drawings. A configuration of the gas detection system by the present example embodiment is the same as that in the first example embodiment. Therefore, a description of the configuration of the gas detection system in the present example embodiment is omitted. Although a number of small unmanned aerial vehicles is three in the present example embodiment, it may be equal to or more than three.

Operation of Third Example Embodiment

Figure 7:
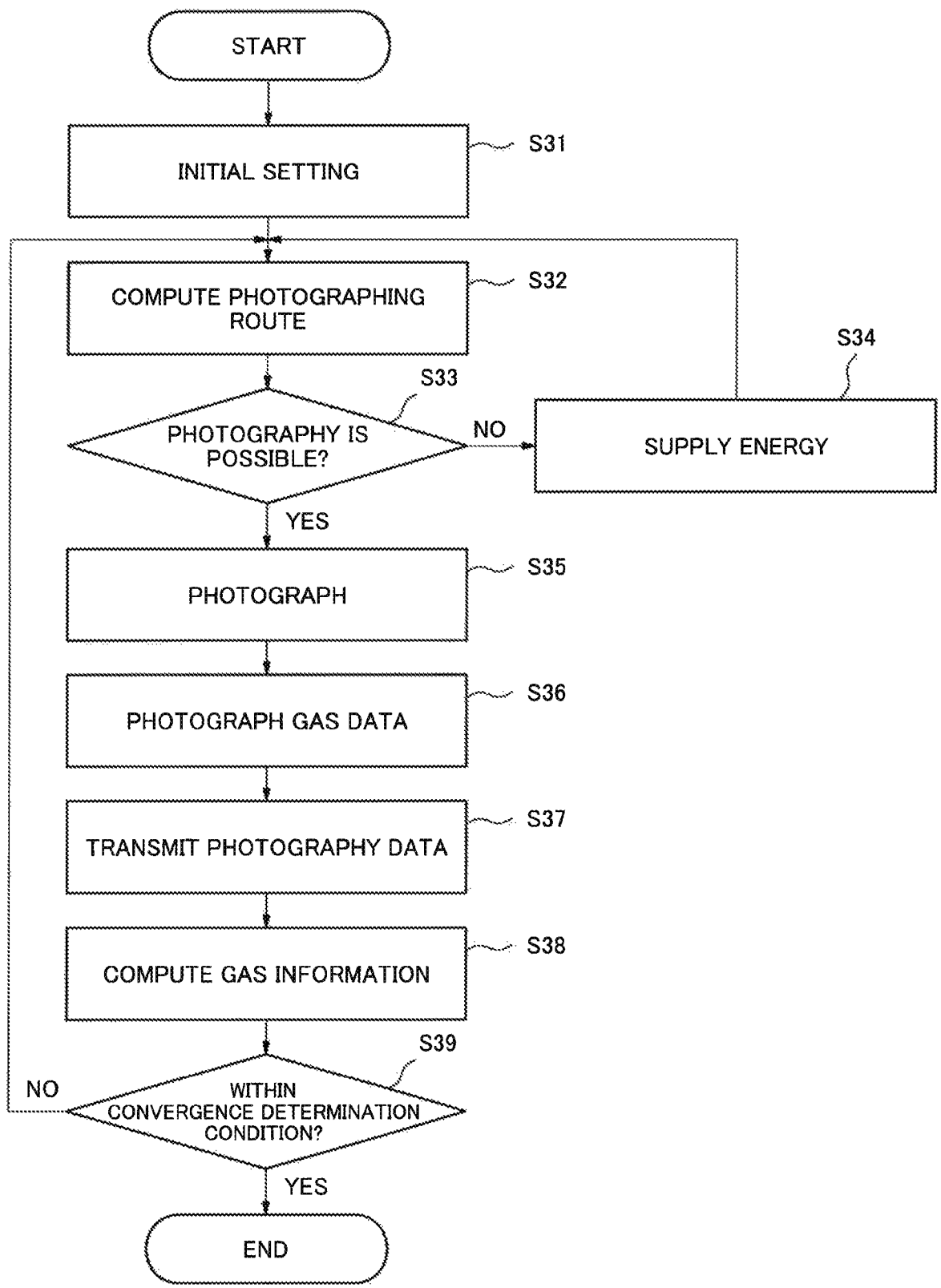
FIG. 7 is a flowchart for illustrating an operation of a gas detection system according to a third example embodiment.

An operation of the gas detection system by the present example embodiment is described with reference to a flowchart of FIG. 7.

First, initial setting of the system is performed (step S31). Specifically, three-dimensional gas information 8, a convergence determination condition of gas information, and current positions and energy remaining amounts of small unmanned aerial vehicles 2A, 2a, and 2b are initially set. Next, based on the above-described three-dimensional gas information, and the current position information and energy remaining amounts of the small unmanned aerial vehicles 2A, 2a, and 2b, a photographing-route computing unit 4 computes a photographing route of each small unmanned aerial vehicle in such a way that energy remaining amounts after an end of photography become equal to each other (step S32). Then, it is determined whether or not photography by a small unmanned aerial vehicle is possible with a current energy remaining amount (step S33). When photography is not possible, energy is supplied to the small unmanned aerial vehicle (step S34). Next, based on the photographing route, the small unmanned aerial vehicles 2A, 2a, and 2b photograph data on a place where no gas is present, in order to acquire correction data (step S35). When data on a place where no gas is present are photographed, light is applied to the small unmanned aerial vehicle 2a and/or the small unmanned aerial vehicle 2b from the small unmanned aerial vehicle 2A, based on information in a position identification unit installed in each small unmanned aerial vehicle. Next, based on the photographing route, the small unmanned aerial vehicles 2A, 2a, and 2b photograph gas data of a place where gas is present, while moving with a positional relation of the small unmanned aerial vehicles 2A, 2a, and 2b being fixed (step S36). In the present example embodiment, photography is performed in such a way that a distance between a light-emitting unit and a light-receiving unit in which no gas is estimated to be present in the photography in step S35 is equal to a distance between a light-emitting unit and a light-receiving unit in which gas is estimated to be present in the photography in step S36.

Next, the correction data and the gas data are transmitted to a gas computing and displaying unit 3 (step S37). Then, in the gas computing and displaying unit 3, new three-dimensional gas information is computed, based on data corrected by use of the correction data (step S38). Then, it is determined whether or not the new gas information and the initially set gas information are within a convergence determination condition (step S39). When the new gas information and the initially set gas information are within the convergence determination condition, the operation is ended.

Advantageous Effect in Third Example Embodiment

According to the gas detection system in the present example embodiment, the photographing-route computing unit 4 computes an optimum photographing route from a position of each small unmanned aerial vehicle, and an energy remaining amount of each small unmanned aerial vehicle, as in the first example embodiment and the like. This enables battery exchange timing of each vehicle to be the same. As a result, waste of battery exchange is eliminated, and it becomes possible to detect gas information precisely and in a short time.

Furthermore, in the present example embodiment, two small unmanned aerial vehicles are installed with light-receiving units, and one small unmanned aerial vehicle is installed with a light-emitting unit, as in the first example embodiment and the like. Since a number of small unmanned aerial vehicles installed with light-emitting units is smaller than a number of small unmanned aerial vehicles installed with light-receiving units, a number of costly light-emitting units is reduced, and therefore, cost also becomes lower.

Still further, in the present example embodiment, a distance between a light-emitting unit and a light-receiving unit in which no gas is estimated to be present is equalized to a distance between a light-emitting unit and a light-receiving unit in which gas is estimated to be present. Thereby, data correction using correction data becomes higher in level, and more precise gas detection becomes possible.

Fourth Example Embodiment

Figure 8:
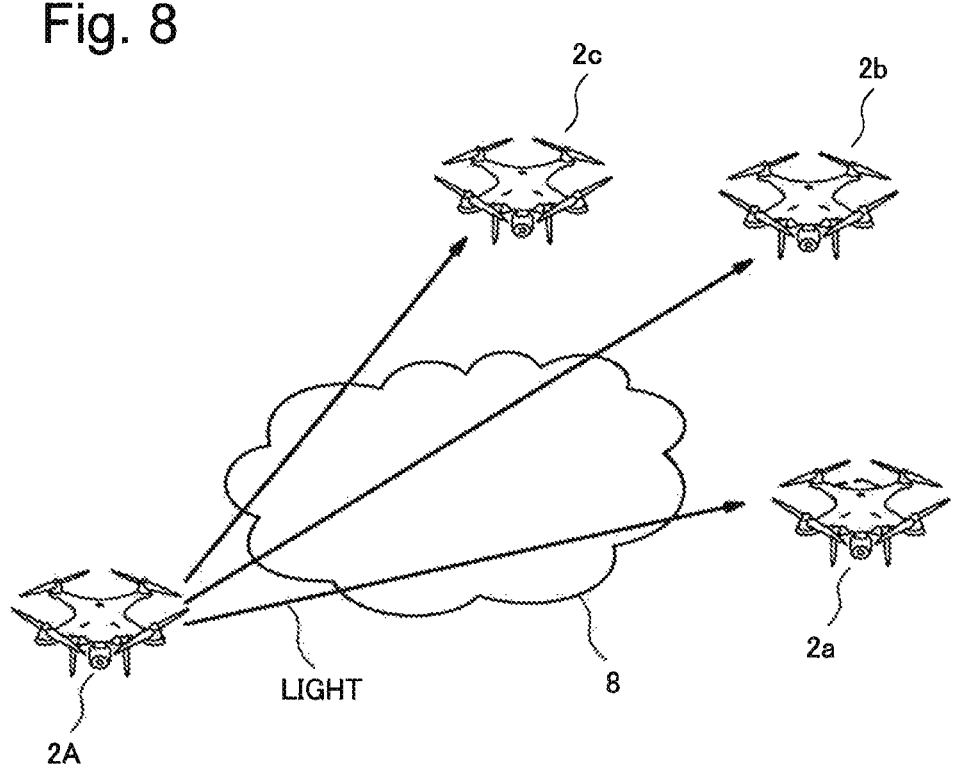
FIG. 8 is a conceptual diagram for illustrating a configuration of a gas detection system according to a fourth example embodiment.
Figure 9:
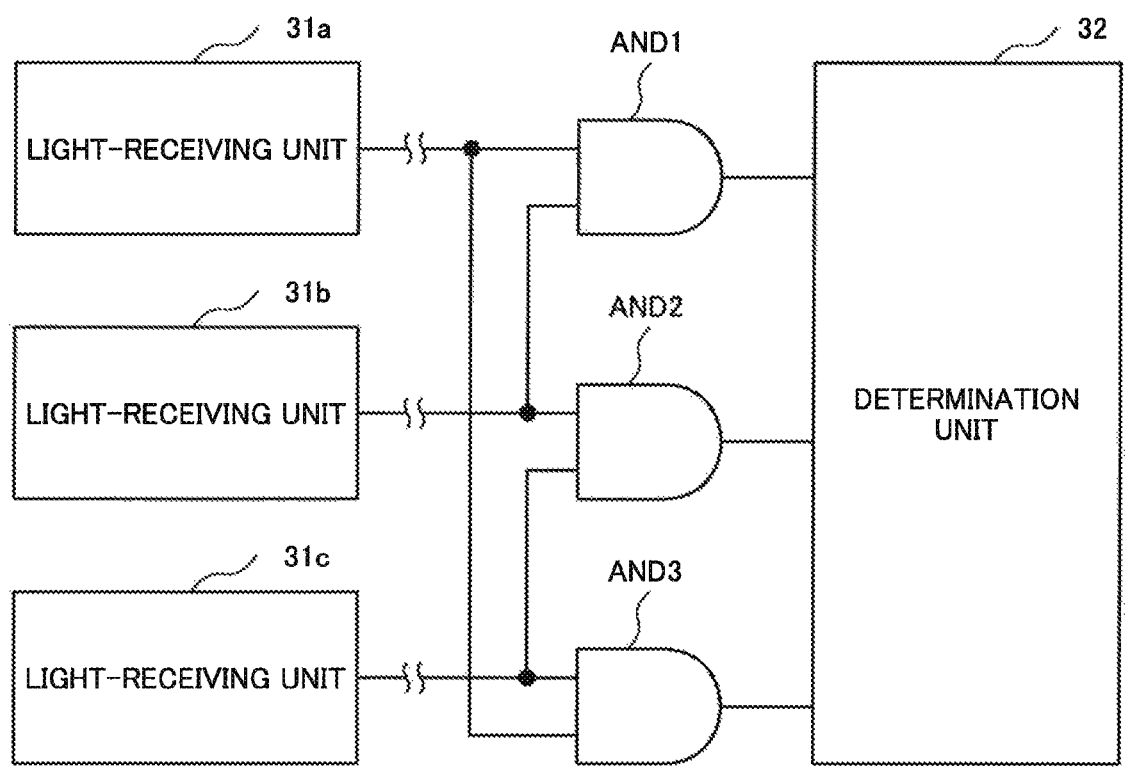
FIG. 9 is a conceptual diagram for illustrating a gas detection operation according to the fourth example embodiment.

Next, a gas detection system according to a fourth example embodiment is described with reference to the drawings. FIG. 8 is a conceptual diagram for illustrating a gas detection operation by the fourth example embodiment. FIG. 9 is a conceptual diagram for illustrating a gas detection operation by the fourth example embodiment.

The present example embodiment is characterized in that a detection wavelength of a light-receiving unit of each small unmanned aerial vehicle is different. A case is assumed where a detection wavelength of each light-receiving unit has a plurality of n detection wavelengths, and a number of light-receiving units is m (a light-receiving unit #1, a light-receiving unit #2, ..., and a light-receiving unit #m, m≥n). Detection wavelengths of the light-receiving unit #1 are $\lambda 2$, $\lambda 3$, ..., and $\lambda$n, detection wavelengths of the light-receiving unit #2 are $\lambda 1$, $\lambda 3$, $\lambda 4$, ..., and $\lambda$n, and detection wavelengths of the light-receiving unit #m are $\lambda 1$, $\lambda 2$, ..., and $\lambda$n−1. From data in the light-receiving unit #1 to the light-receiving unit #m, the respective wavelengths $\lambda 1$, $\lambda 2$, ..., and $\lambda$n are extracted.

A gas detection system 1 according to the present example embodiment is configured by including a small unmanned aerial vehicle, a gas computing and displaying unit 3, and a photographing-route computing unit 4. In the case described in the present example embodiment, a number of small unmanned aerial vehicles is four. Although a number of small unmanned aerial vehicles is four in the present example embodiment, it may be equal to or more than four.

Among the four small unmanned aerial vehicles, a small unmanned aerial vehicle 2A includes a configuration similar to that of the small unmanned aerial vehicle 2A in the first example embodiment illustrated in FIG. 2A. In other words, the small unmanned aerial vehicle 2A includes a light-emitting unit 11, a communication unit 12, a position identification unit 13, a remaining amount measurement unit 14, and a control unit 15.

The light-emitting unit 11 emits infrared light. Note that a light source of the light-emitting unit 11 is not limited to an infrared light source. A light source of the light-emitting unit 11 may be a white light source, or a light source which emits light having a particular wavelength. In addition, the light-emitting wavelength may be variable.

The communication unit 12 performs a communication with other small unmanned aerial vehicles 2a and 2b, a communication with the gas computing and displaying unit 3, and a communication with the photographing-route computing unit 4. The position identification unit 13 identifies a position of a small unmanned aerial vehicle. The remaining amount measurement unit 14 measures an energy remaining amount of a small unmanned aerial vehicle. The control unit 15 controls the whole small unmanned aerial vehicle.

Among the four small unmanned aerial vehicles, small unmanned aerial vehicles 2a, 2b, and 2c include configurations similar to those of the small unmanned aerial vehicles 2a and 2b in the first example embodiment illustrated in FIG. 2B. In other words, the small unmanned aerial vehicles 2a, 2b, and 2c each includes a light-receiving unit 21, a communication unit 22, a position identification unit 23, a remaining amount measurement unit 24, and a control unit 25.

The communication unit 22 performs a communication with another small unmanned aerial vehicle such as the small unmanned aerial vehicle 2A, a communication with the gas computing and displaying unit 3, and a communication with the photographing-route computing unit 4. The position identification unit 23 identifies a position of a small unmanned aerial vehicle. The remaining amount measurement unit 24 measures an energy remaining amount of a small unmanned aerial vehicle. The control unit 25 controls the whole small unmanned aerial vehicle.

In the present example embodiment, it is assumed that, for example, the small unmanned aerial vehicle 2a is installed with a light-receiving unit 31a, the small unmanned aerial vehicle 2b is installed with a light-receiving unit 31b, and the small unmanned aerial vehicle 2c is installed with a light-receiving unit 31c. It is assumed that detection wavelengths of the light-receiving unit 31a of the small unmanned aerial vehicle 2a are $\lambda 2$ and $\lambda 3$, detection wavelengths of the light-receiving unit 31b of the small unmanned aerial vehicle 2b are $\lambda 1$ and $\lambda 3$, and detection wavelengths of the light-receiving unit 31c of the small unmanned aerial vehicle 2c are $\lambda 1$ and $\lambda 2$.

Operation of Fourth Example Embodiment

An operation of the gas detection system by the present example embodiment is described with reference to a flowchart of FIG. 10.

First, initial setting of the system is performed (step S41). Specifically, three-dimensional gas information 8, a convergence determination condition of gas information, and current positions and energy remaining amounts of small unmanned aerial vehicles 2A, 2a, 2b, and 2c are initially set. Next, based on the above-described three-dimensional gas information, the current position information and energy remaining amounts of the small unmanned aerial vehicles 2A, 2a, 2b, and 2c, the photographing-route computing unit 4 computes a photographing route of each aerial vehicle in such a way that energy remaining amounts after an end of photography become equal to each other (step S42). Then, it is determined whether or not photography by a small unmanned aerial vehicle is possible with a current energy remaining amount (step S43). When photography is not possible, energy is supplied to the small unmanned aerial vehicle (step S44). When photography is possible, the small unmanned aerial vehicles 2A, 2b, and 2c photograph, based on the photographing route (step S45). At a time of photography, light is applied to the small unmanned aerial vehicles 2b to 2c from the small unmanned aerial vehicle 2A, based on information in a position identification unit installed in each small unmanned aerial vehicle. Then, the small unmanned aerial vehicles 2b to 2c each transmit received data to the gas computing and displaying unit 3 (step S46).

In the gas computing and displaying unit 3, data from the light-receiving unit 31a and the light-receiving unit 31b are input to a logical product AND 1. When an output of the AND 1 is 1, a determination unit 32 determines that the AND output data is data of the wavelength $\lambda 3$. Data from the light-receiving unit 31b and the light-receiving unit 31c are input to a logical product AND 2. When an output of the AND 2 is 1, the determination unit 32 determines that the AND output data is data of the wavelength $\lambda 1$. Data from the light-receiving unit 31a and the light-receiving unit 31c are input to a logical product AND 3. When an output of the AND 3 is 1, the determination unit 32 determines that the AND output data is data of the wavelength $\lambda 2$. When all the outputs are 0, the determination unit 32 determines that no detect ion wavelengths are present (step S47).

Next, based on the data, new three-dimensional gas information is computed in the gas computing and displaying unit 3 (step S48). Then, it is determined whether or not the new gas information and the initially set gas information are within a convergence determination condition (step S49). When the new gas information and the initially set gas information are within the convergence determination condition, the operation is ended.

Advantageous Effect in Fourth Example Embodiment

According to the gas detection system in the present example embodiment, the photographing-route computing unit 4 computes an optimum photographing route from a position of each small unmanned aerial vehicle, and an energy remaining amount of each small unmanned aerial vehicle, as in the first example embodiment and the like. This enables battery exchange timing of each vehicle to be the same. As a result, waste of battery exchange is eliminated, and it becomes possible to detect gas information precisely and in a short time.

Furthermore, in the present example embodiment, three small unmanned aerial vehicles are installed with light-receiving units, and one small unmanned aerial vehicle is installed with a light-emitting unit. As in the first example embodiment and the like, since a number of small unmanned aerial vehicles installed with light-emitting units is smaller than a number of small unmanned aerial vehicles installed with light-receiving units, a number of costly light-emitting units is reduced, and therefore, cost also becomes lower.

Still further, in the present example embodiment, the small unmanned aerial vehicles 2a, 2b, and 2c are configured to be able to receive light having a plurality of wavelengths. Data accuracy can be enhanced by increasing wavelengths of light that can be received by the small unmanned aerial vehicles 2a, 2b, and 2c, and increasing a data amount. In addition, in the present example embodiment, complicated spectral dispersion processing is unnecessary, and therefore, more precise gas detection becomes possible in a short time.

Modification Example of Example Embodiment

While the preferred example embodiments of the present invention have been described above, the present invention is not limited thereto. For example, although the case of three detection wavelengths has been described in the above-described fourth example embodiment, a number of detection wavelengths is not limited thereto.

For example, a number of detection wavelengths can be four. For example, detection wavelengths of the light-receiving unit 31a of the small unmanned aerial vehicle 2a may be $\lambda 1$, $\lambda 2$ and $\lambda 4$, detection wavelengths of the light-receiving unit 31b of the small unmanned aerial vehicle 2b may be $\lambda 1$ and $\lambda 3$, and detection wavelengths of the light-receiving unit 31c of the small unmanned aerial vehicle 2c may be $\lambda 2$ and $\lambda 3$.

Figure 10:
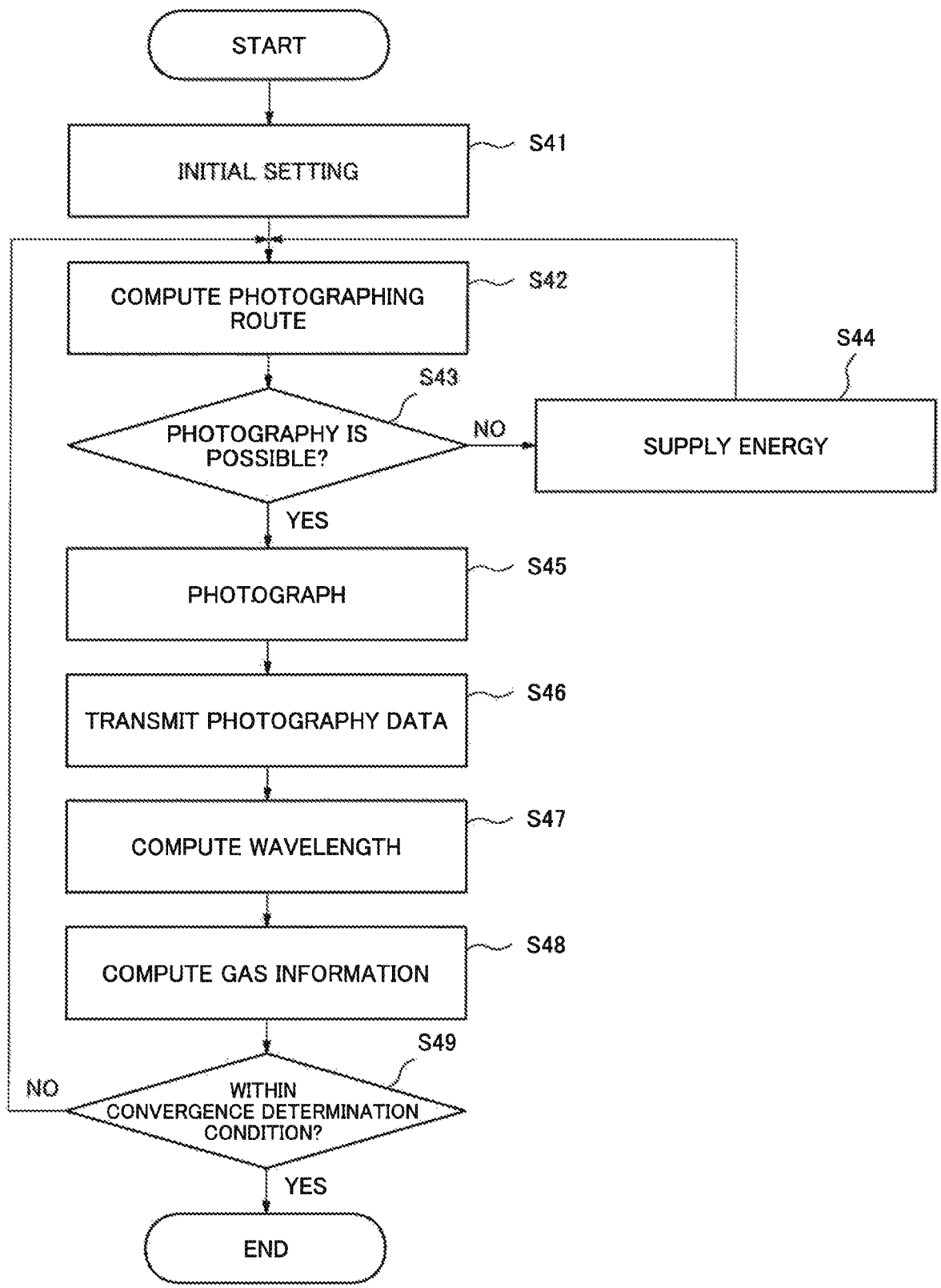
FIG. 10 is a flowchart for illustrating an operation of the gas detection system according to the fourth example embodiment.

In this case, step S47 in the flowchart of FIG. 10 is as follows. Data in the light-receiving units 31b and 31c are input to a different AND. When an output of the AND is 1, a detection wavelength is determined to be $\lambda 3$. When an output of the above-described different AND is 0, and an output of the light-receiving unit 31b is 1, a detection wavelength is determined to be $\lambda 1$. When an output of the above-described different AND is 0, and an output of the light-receiving unit 31c is 1, a detection wavelength is determined to be $\lambda 2$. When an output of the light-receiving unit 31a is 1, an output of the light-receiving unit 31b is 0, and an output of the light-receiving unit 31c is 0, a detection wavelength is determined to be $\lambda 4$. When step S47 in the fourth example embodiment is executed in this way, optimum computation processing is able to be applied depending on a number of wavelengths and a number of light-receiving units.

In the example embodiments described above, it is conceivable that a number of transmitting aerial vehicles is two or more, and each transmitting aerial vehicle is installed with a light-emitting unit having a different light-emitting wavelength. When each transmitting aerial vehicle is installed with a light-emitting unit having a different light-emitting wavelength, spectral photography is not needed in a light-receiving unit, and light dispersion by a light-receiving unit is not needed either. Thus, a photographing speed is increased by improvement of signal to noise ratio (S/N ratio).

It goes without saying that various modifications may be made within the scope of the invention described in claims, and also fall within the present invention.

The whole or part of the example embodiments disclosed above can be described as, but not limited to, the following supplementary notes.

(Supplementary note 1) A gas detection system including: a small unmanned aerial vehicle including a transmitting aerial vehicle in which a light-emitting unit is installed, and a receiving aerial vehicle in which a light-receiving unit is installed; a gas computing and displaying unit which computes and displays gas information; and a photographing-route computing unit which computes a photographing route by the small unmanned aerial vehicle, wherein the receiving aerial vehicle receives light from the light-emitting unit of the transmitting aerial vehicle by the light-receiving unit and transmits the light, as gas data, to the gas computing and displaying unit, the gas computing and displaying unit computes the gas information from the gas data, and the photographing-route computing unit computes the photographing route from a position of the small unmanned aerial vehicle and an energy remaining amount of the small unmanned aerial vehicle.

(Supplementary note 2) The gas detection system according to Supplementary note 1, wherein the photographing-route computing unit computes the photographing route from a position where data in the gas computing and displaying unit are lacking the gas information, a position of the small unmanned aerial vehicle, and an energy remaining amount of the small unmanned aerial vehicle.

(Supplementary note 3) The gas detection system according to Supplementary note 1 or 2, wherein two or more receiving aerial vehicles are installed with the light-receiving units, and the light-receiving unit of each of the receiving aerial vehicles has a different detection wavelength.

(Supplementary note 4) The gas detection system according to Supplementary note 3, wherein detection wavelengths of the light-receiving units of the receiving aerial vehicles are a plurality of n detection wavelengths ($\lambda 1$, $\lambda 2$, ..., and $\lambda n$), m (m≥n) receiving aerial vehicles are installed with the light-receiving units, detection wavelengths of a first light-receiving unit are $\lambda 2$, $\lambda 3$, ..., and $\lambda n$, detection wavelengths of a second light-receiving unit are $\lambda 1$, $\lambda 3$, $\lambda 4$, ..., and $\lambda n$, detection wavelengths of an m-th light-receiving unit are $\lambda 1$, $\lambda 2, \ldots$, and $\lambda n-1$, and the respective wavelengths $\lambda 1$, $\lambda 2, \ldots$, and $\lambda n$ are extracted from data in a first to m-th light-receiving units.

(Supplementary note 5) The gas detection system according to any one of Supplementary notes 1 to 4, wherein two or more transmitting aerial vehicles are installed with the light-emitting units, and the light-emitting unit of each of the transmitting aerial vehicles has a different light-emitting wavelength.

(Supplementary note 6) The gas detection system according to any one of Supplementary notes 1 to 5, wherein measurement data between a light-emitting unit of a transmitting aerial vehicle and a light-receiving unit of a receiving aerial vehicle in which gas is estimated to be present are corrected by use of measurement data between a light-emitting unit of a transmitting aerial vehicle and a light-receiving unit of a receiving aerial vehicle in which no gas is estimated to be present.

(Supplementary note 7) The gas detection system according to any one of Supplementary notes 1 to 6, wherein photography is performed in such a way that a distance between a light-emitting unit of a transmitting aerial vehicle and a light-receiving unit of a receiving aerial vehicle in which no gas is estimated to be present is substantially equal to a distance between a light-emitting unit of a transmitting aerial vehicle and a light-receiving unit of a receiving aerial vehicle in which gas is estimated to be present.

(Supplementary note 8) The gas detection system according to any one of Supplementary notes 1 to 7, wherein a wavelength band of the light-emitting unit of the transmitting aerial vehicle is a band (2.8 to 3.5 μm band, 5 to 8 μm band, or 9.8 to 10.5 μm band) outside of an atmospheric window.

(Supplementary note 9) The gas detection system according to any one of Supplementary notes 1 to 8, wherein a wavelength band of the light-receiving unit of the receiving aerial vehicle is a band (2.8 to 3.5 μm band, 5 to 8 μm band, or 9.8 to 10.5 μm band) outside of an atmospheric window.

(Supplementary note 10) The gas detection system according to any one of Supplementary notes 1 to 9, wherein the light-receiving unit of the receiving aerial vehicle includes a function of dispersing infrared light into a spectrum and receiving the dispersed spectrum, and the gas computing and displaying unit includes a function of processing a dispersed spectrum into an image.

(Supplementary note 11) A gas detection method for a gas detection system including: a small unmanned aerial vehicle including a transmitting aerial vehicle in which a light-emitting unit is installed, and a receiving aerial vehicle in which a light-receiving unit is installed; a gas computing and displaying unit which computes and displays gas information; and a photographing-route computing unit which computes a photographing route by the small unmanned aerial vehicle, the gas detection method comprising: receiving light from the light-emitting unit of the transmitting aerial vehicle by the light-receiving unit and transmitting the light, as gas data, to the gas computing and displaying unit by the receiving aerial vehicle; computing the gas information from the gas data by the gas computing and displaying unit; and computing the photographing route from a position of the small unmanned aerial vehicle and an energy remaining amount of the small unmanned aerial vehicle by the photographing-route computing unit.

(Supplementary note 12) The gas detection method according to Supplementary note 11, wherein the photographing-route computing unit computes the photographing route from a position where data in the gas computing and displaying unit are lacking the gas information, a position of the small unmanned aerial vehicle, and an energy remaining amount of the small unmanned aerial vehicle.

(Supplementary note 13) The gas detection method according to Supplementary note 11 or 12, wherein two or more receiving aerial vehicles are installed with the light-receiving units, and the light-receiving unit of each of the receiving aerial vehicles has a different detection wavelength.

(Supplementary note 14) The gas detection method according to Supplementary note 13, wherein detection wavelengths of the light-receiving units of the receiving aerial vehicles are a plurality of n detection wavelengths ($\lambda 1$, $\lambda 2, \ldots$, and $\lambda n$), m (m≥n) receiving aerial vehicles are installed with the light-receiving units, detection wavelengths of a first light-receiving unit are $\lambda 2, \lambda 3, \ldots$, and $\lambda n$, detection wavelengths of a second light-receiving unit are $\lambda 1, \lambda 3, \lambda 4, \ldots$, and $\lambda n$, detection wavelengths of an m-th light-receiving unit are $\lambda 1, \lambda 2, \ldots$, and $\lambda n-1$, and the respective wavelengths $\lambda 1, \lambda 2, \ldots$, and $\lambda n$ are extracted from data in a first to m-th light-receiving units.

(Supplementary note 15) The gas detection method according to any one of Supplementary notes 11 to 14, wherein two or more transmitting aerial vehicles are installed with the light-emitting units, and the light-emitting unit of each of the transmitting aerial vehicles has a different light-emitting wavelength.

(Supplementary note 16) The gas detection method according to any one of Supplementary notes 11 to 15, wherein measurement data between a light-emitting unit of a transmitting aerial vehicle and a light-receiving unit of a receiving aerial vehicle in which gas is estimated to be present are corrected by use of measurement data between a light-emitting unit of a transmitting aerial vehicle and a light-receiving unit of a receiving aerial vehicle in which no gas is estimated to be present.

(Supplementary note 17) The gas detection method according to any one of Supplementary notes 11 to 16, wherein photography is performed in such a way that a distance between a light-emitting unit of a transmitting aerial vehicle and a light-receiving unit of a receiving aerial vehicle in which no gas is estimated to be present is substantially equal to a distance between a light-emitting unit of a transmitting aerial vehicle and a light-receiving unit of a receiving aerial vehicle in which gas is estimated to be present.

(Supplementary note 18) The gas detection method according to any one of Supplementary notes 11 to 17, wherein a wavelength band of the light-emitting unit of the transmitting aerial vehicle is a band (2.8 to 3.5 μm band, 5 to 8 μm band, or 9.8 to 10.5 μm band) outside of an atmospheric window.

(Supplementary note 19) The gas detection method according to any one of Supplementary notes 11 to 17, wherein a wavelength band of the light-receiving unit of the receiving aerial vehicle is a band (2.8 to 3.5 μm band, 5 to 8 μm band, or 9.8 to 10.5 μm band) outside of an atmospheric window.

(Supplementary note 20) The gas detection method according to any one of Supplementary notes 11 to 19, wherein the light-receiving unit of the receiving aerial vehicle includes a function of dispersing infrared light into a spectrum and receiving the dispersed spectrum, and the gas computing and displaying unit includes a function of processing a dispersed spectrum into an image.

The present invention has been described so far with the above-described example embodiments as exemplars. However, the present invention is not limited to the above-described example embodiments. In other words, various aspects that may be appreciated by a person skilled in the art are applicable to the present invention within the scope of the present invention.

REFERENCE SIGNS LIST

1 Gas detection system
2A, 2a, 2b, 2c Small unmanned aerial vehicle
3 Gas computing and displaying unit
4 Photographing-route computing unit
8 Three-dimensional gas information
11 Light-emitting unit
21, 31a, 31b, 31c Light-receiving unit
12, 22 Communication unit
13, 23 Position identification unit
14, 24 Remaining amount measurement unit
15, 25 Control unit
32 Determination unit

The invention claimed is:

1. A gas detection system including:
small unmanned aerial vehicles including:
  a transmitting aerial vehicle in which a light emitter is installed; and
  a receiving aerial vehicle in which a light receiver is installed;
at least one processor configured to implement:
  a gas computing and displaying unit which computes and controls display of gas information; and
  a photographing-route computing unit which computes a photographing route of each of the small unmanned aerial vehicles, wherein:
    the receiving aerial vehicle receives light from the light emitter of the transmitting aerial vehicle using the light receiver, and transmits gas data photographed by receiving the light to the gas computing and displaying unit,
    the gas computing and displaying unit computes the gas information from the gas data, and
    the photographing-route computing unit computes the photographing route based on a position of each of the small unmanned aerial vehicles and energy remaining amounts of each of the small unmanned aerial vehicles, so that each of the energy remaining amounts become equal to each other after an end of photography.

2. The gas detection system according to claim 1, wherein the photographing-route computing unit computes the photographing route from a position where data in the gas computing and displaying unit is lacking the gas information, the position of each of the small unmanned aerial vehicles, and the energy remaining amount of each of the small unmanned aerial vehicles.

3. The gas detection system according to claim 1, wherein two or more receiving aerial vehicles are installed with the light receiver, and
  wherein the light receiver of each of the two or more receiving aerial vehicles has a different detection wavelength.

4. The gas detection system according to claim 3, wherein detection wavelengths used for detecting target gas are a plurality of n detection wavelengths,
  wherein each of the two or more receiving aerial vehicles detects n−1 detection wavelengths of the n detection wavelengths,
  wherein the detection wavelengths undetected by each of the two or more receiving aerial vehicles are different from each other, and
  wherein the n detection wavelengths are extracted from data based on the detection wavelengths detected by each of the two or more receiving aerial vehicles.

5. The gas detection system according to claim 1, wherein two or more transmitting aerial vehicles are installed with the light emitter, and
  wherein the light emitter of each of the two or more transmitting aerial vehicles has a different light-emitting wavelength.

6. The gas detection system according to claim 1, wherein measurement data in a location in which target gas to be detected is estimated to be present is corrected using measurement data at a location in which the target gas to be detected is not estimated to be present.

7. The gas detection system according to claim 1, wherein the photography is performed in such a way that a distance between the light emitter and the light receiver in a location in which target gas to be detected is estimated to be present is substantially equal to a distance between the light emitter and the light receiver in a location in which the target gas to be detected is not estimated to be present.

8. The gas detection system according to claim 1, wherein a wavelength band of the light emitter of the transmitting aerial vehicle is a band outside of an atmospheric window, and
  wherein the wavelength band is one of 2.8 to 3.5 μm band, 5 to 8 μm band, or 9.8 to 10.5 μm band.

9. The gas detection system according to claim 1, wherein a wavelength band of the light receiver of the receiving aerial vehicle is a band outside of an atmospheric window, and
  wherein the wavelength band is one of 2.8 to 3.5 μm band, 5 to 8 μm band, or 9.8 to 10.5 μm band.

10. The gas detection system according to claim 1, wherein the light receiver of the receiving aerial vehicle includes a function of dispersing infrared light into a spectrum and receiving the dispersed spectrum, and
  wherein the gas computing and displaying unit includes a function of processing the dispersed spectrum into an image.

11. A gas detection method for a gas detection system including:
small unmanned aerial vehicles including a transmitting aerial vehicle in which a light emitter is installed, and a receiving aerial vehicle in which a light receiver is installed; at least one processor configured to implement a gas computing and displaying unit which computes and controls display of gas information, and to implement a photographing-route computing unit which computes a photographing route of each of the small unmanned aerial vehicles, the gas detection method comprising:
  receiving light from the light emitter of the transmitting aerial vehicle using the light receiver, and transmitting gas data photographed by receiving the light to the gas computing and displaying unit by the receiving aerial vehicle;
  computing the gas information from the gas data by the gas computing and displaying unit; and
  computing the photographing route based on a position of each of the small unmanned aerial vehicles and energy remaining amounts of each of the small unmanned aerial vehicles, so that each of the energy remaining amounts become equal to each other after an end of photography by the photographing-route computing unit.

12. The gas detection method according to claim 11, wherein the photographing-route computing unit computes the photographing route from a position where data in the gas computing and displaying unit is lacking the gas information, the position of each of the small unmanned aerial vehicles, and the energy remaining amount of each of the small unmanned aerial vehicles.

13. The gas detection method according to claim 11, wherein two or more receiving aerial vehicles are installed with the light receiver, and
   wherein the light receiver of each of the two or more receiving aerial vehicles has a different detection wavelength.

14. The gas detection method according to claim 13, wherein detection wavelengths used for detecting target gas are a plurality of n detection wavelengths,
   wherein each of the two or more receiving aerial vehicles detects n−1 detection wavelengths of the n detection wavelengths,
   wherein the detection wavelengths undetected by each of the two or more receiving aerial vehicles are different from each other, and
   wherein the n detection wavelengths are extracted from data based on the detection wavelengths detected by each of the two or more receiving aerial vehicles.

15. The gas detection method according to claim 11, wherein two or more transmitting aerial vehicles are installed with the light emitter, and
   wherein the light emitter of each of the two or more transmitting aerial vehicles has a different light-emitting wavelength.

16. The gas detection method according to claim 11, wherein measurement data in a location in which target gas to be detected is estimated to be present is corrected using measurement data at a location in which the target gas to be detected is not estimated to be present.

17. The gas detection method according to claim 11, wherein the photography is performed in such a way that a distance between the light emitter and the light receiver in a location in which target gas to be detected is estimated to be present is substantially equal to a distance between the light emitter and the light receiver in a location in which the target gas to be detected is not estimated to be present.

18. The gas detection method according to claim 11, wherein a wavelength band of the light emitter of the transmitting aerial vehicle is a band outside of an atmospheric window, and
   wherein the wavelength band is one of 2.8 to 3.5 μm band, 5 to 8 μm band, or 9.8 to 10.5 μm band.

19. The gas detection method according to claim 11, wherein a wavelength band of the light receiver of the receiving aerial vehicle is a band outside of an atmospheric window, and
   wherein the wavelength band is one of 2.8 to 3.5 μm band, 5 to 8 μm band, or 9.8 to 10.5 μm band.

20. The gas detection method according to claim 11, wherein the light receiver of the receiving aerial vehicle includes a function of dispersing infrared light into a spectrum and receiving the dispersed spectrum, and
   wherein the gas computing and displaying unit includes a function of processing the dispersed spectrum into an image.

* * * * *